United States Patent [19]

Swaisgood

[11] 4,053,644

[45] Oct. 11, 1977

[54] PROCESS OF REMOVING THE COOKED FLAVOR FROM MILK

[75] Inventor: Harold E. Swaisgood, Raleigh, N.C.

[73] Assignee: Research Triangle Institute, Research Triangle Park, N.C.

[21] Appl. No.: 621,631

[22] Filed: Oct. 10, 1975

[51] Int. Cl.² .......................... A23C 3/02; A23C 9/12; C07G 7/02
[52] U.S. Cl. ........................................ 426/42; 195/63; 195/68; 195/DIG. 11; 195/116; 426/330.2; 426/522
[58] Field of Search ................... 426/42, 34, 522, 316, 426/330.2; 195/63, 68, DIG. 11, 116

[56] References Cited

U.S. PATENT DOCUMENTS

| 2,482,724 | 9/1949 | Baker | 426/42 X |
|---|---|---|---|
| 2,788,283 | 4/1957 | Stewart, Jr. et al. | 426/522 X |
| 3,282,702 | 11/1966 | Schreiner | 195/68 X |
| 3,627,640 | 12/1971 | Blumberg et al. | 195/63 |

OTHER PUBLICATIONS

Swaisgood et al., Immobilization of Sulfhydryl Oxidase and Some of its Kinetic Properties, J. Da. Sci., vol. 58, No. 5, May 1975, (p. 796).

Townley, et al., A Quantitative Study of the Heat Labile Sulfides of Milk, J. Da. Sci., vol. 26, 1943 (pp. 853–867).

Janolino et al., Isolation and Characterization of Sulfhydryl Oxidase from Bovine Milk, The Journal of Biological Chemistry, vol. 250, No. 7, 4/10/75 (pp. 2532–2538).

*Primary Examiner*—David M. Naff
*Attorney, Agent, or Firm*—Cushman, Darby & Cushman

[57] ABSTRACT

Milk having "cooked" flavor produced by heat treatment, such as ultra-high-temperature processing, is contacted with immobilized sulfhydryl oxidase to remove the "cooked" flavor.

4 Claims, No Drawings

PROCESS OF REMOVING THE COOKED FLAVOR FROM MILK

The Government has rights in this invention pursuant to Grant Number GI-39208 awarded by the National Science Foundation.

BACKGROUND OF THE INVENTION

Milk when heated at temperatures in excess of 155° F for varying periods of time is known to acquire a "cooked flavor." Currently fluid milk is pasteurized or "ultra-pasteurized" by heat treatments of whole milk at temperatures ranging from 140° to 165° F for periods of from 30 minutes to as low as 2 seconds. Such treatment is necessary to destroy disease-producing bacteria and check the activity of the fermentative bacteria found in raw whole milk. However, all bacteria in raw whole milk are not killed by such treatment and hence the milk has a limited shelf-life and must be refrigerated at temperatures near 4° C during all shipping, marketing and storing.

There are processes known for producing ultrahightemperature (UHT) sterilized milk. Such processes are described for example by H. Burton, *Dairy Science Abst.*, 31, pages 287–297 (1969) aND T. R. Ashton, *J. Soc. Dairy Tech.*, Vol. 18, No. 2 pp. 65–83 (1965). While UHT processing of milk has a slightly different meaning in the U.S. and Canada from that in Europe each involves treatment of milk at temperatures of at least 190° F for varying periods of time and generally at about 300° F for around 4 seconds. Unfortunately, milk when heat treated at such high temperatures (or even lower for more prolonged periods of time), develops an undesirable and unpalatable "cooked" flavor thus rendering the milk generally unmarketable, especially in the United States. Much research has been carried out to determine the nature of the "cooked" flavor and provide a means for its elimination. Both J. T. Hutton et al. *J. of Dairy Science*, 35 P. 699 (1952) and H. Burton, *Proc. 15th International Dairy Congress* 3, p. 1729 (1952) have speculated that the "cooked" flavor of heated milk is due to the liberation of sulfhydryl groups in the milk. Later work of Burton (*Dairy Sci. Abstr.*, 31 p. 295–1969) as well as others has expressed doubts as to the significance of free sulfhydryl groups in milk.

Prior to the present invention there was no procedure know for removing the "cooked" flavor caused by the heating process of UHT-sterilized milk and other similarly treated milk. In some cases the intensity of the "cooked" flavor has been reduced, but not removed, by refrigeration.

In 1971, over 45 billion pounds of fluid milk were sold in the United States all of which required extensive refrigeration. While sterilization of fluid milk would have the obvious advantages of conserving energy and fuel requirements in processing, increasing product shelf-life, permitting shipping, marketing and storing at ambient temperatures, the presence of a "coooked" flavor currently associated with such milk renders it generally unmarketable.

I have now discovered that the "cooked" flavor associated with heat treated fluid milk can be removed according to my invention as described hereinbelow.

Accordingly, it is the primary object of my invention to provide a process whereby the "cooked" flavor attendant to heat treated fluid milk is removed.

It is a further object of my invention to provide a means for producing a marketable fluid milk which may be shipped, marketed and stored at ambient temperatures without deterioration and spoilage.

A still yet further object of the present invention is to provide a means whereby one may obtain fluid milk having a prolonged shelf-life without the necessity of refrigeration.

Yet another object of the invention is to provide a method of processing milk which will remain wholesome without refrigeration and possess a good flavor which to the average consumer can not be distinguished from freshly pasteurized homogenized milk.

These and other objects of the present invention will become apparent from the following discussion.

SUMMARY OF THE INVENTION

The "cooked" flavor in fluid milk which results from subjecting the milk to sufficient heat for a period of time, is removed by contacting the heat treated fluid milk with an immobilized sulfhydryl oxidase enzyme.

The term "cooked" flavor as used herein refers to the chalky flat or insipid taste attendant fluid milk treated at temperatures generally in excess of about 155° F. Such milk may be unpleasant both to taste and smell resembling boiled cabbage. While such a cabbagy smell may disappear within several days after treatment of the milk, the flat, chalky "cooked" flavor which eventually produces a cardboardy cooked flavor remains.

The immobilized sulfhydryl oxidase enzyme employed according to the present invention may be prepared according to the procedure described in my copending U.S. patent application Ser. No. 621,630, filed concurrently herewith titled "SULFHYDRYL OXIDASE — ITS PURIFICATION, IMMOBILIZATION AND REACTIVATION," the entire contents of which is incorporated herein by reference.

My work has shown that indeed the "cooked" flavor in fluid milk results from the exposure and reactions of sulfhydryl groups in milk proteins arising from the heat denaturation of the fluid milk. The sulfhydryl oxidase enzyme obtained from raw whole milk and used according to the present invention catalyzes the conversion of sulfhydryls to disulfides. Apparently the oxidation of sulfhydryl groups in heated milk through contact with immobilized sulfhydryl oxidase eliminates the "cooked" flavor.

Use of the immobilized sulfhydryl oxidase catalyst according to the present invention has the advantage that the emzyme is obtained from whole raw milk and is thus a natural constituent. Furthermore, use of the enzyme in its immobilized form according to the present invention means that there is no additive to the milk being treated.

The invention will be more fully described by reference to the following examples, but which are not to be construed as limiting the scope thereof.

EXAMPLE 1

A biocatalytic reactor containing immobilized sulfhydryl oxidase is formed by filling a 6mm diameter glass column with 1.4cc of sulfhydryl oxidase enzyme immobilized by attachment to glass beads having a pore size of about 2000A. The reactor is a glass column which contains the immobilized enzyme and is adapted to receive heat treated milk (inlet) whick flows through the column and bed of immobilized enzyme with appropriate means for subsequent discharge of the milk after contacting the immobilized enzyme. The reactor can be placed in such a manner to provide a continuous flow process by directly coupling to a UHT processing unit.

EXAMPLE 2

Bovine milk which is subjected to a temperature of 300° F for about 4 seconds has a noticeable "cooked" flavor and is passed through the biocatalytic reactor described in Example 1 at a temperature of between 30°–35° C and a flow of about 40ml/hour. The unpleasant odor and "cooked" flavor present in the milk prior to treatment is eliminated.

The percentage oxidation of sulfhydryl groups in heat-treated milk and the stability of the reactor described above is illustrated by the data in Table 1.

TABLE 1

Stability of a Sulfhydryl Oxidase Reactor Operating with UHT Sterilized Skim Milk A 1.4 cc reactor was operated at a flow rate of 40 ml/hr at 35° C.

| Day of Operation | Duration of Operation (hr) | Percent Oxidation |
|---|---|---|
| Fresh | 5 | 45 |
| Fifth Day | 3 | 34 |
| Tenth Day | 5 | 31 |

It is preferred to use glass beads of a pore size greater than about 700A to immobilize the enzyme for use in treating milk according to the present invention. Smaller sizes yield unfavorable results, and optimum activity is achieved with a pore size of about 2000A.

One should avoid contacting the milk and immobilized enzyme at high temperatures since high temperatures may cause the enzyme to loose activity. Contact temperatures of from 20°–45° C and preferably 30°–35° C may be employed without significant loss of enzyme activity.

As the activity of the immobilized enzyme drops through normal use according to the present invention, reactivation may be achieved through contacting the immobilized enzyme with a fresh aqueous solution of ferrous sulfate.

The consequences of contacting fluid heat treated milk with immobilized sulfhydryl oxidase enzyme may be more far reaching than simply removal of the "cooked" flavor as such treatment also appears to prevent development of other undesirable flavors and destabilization of milk proteins.

Treatment of high temperature treated milk according to the present invention provides a means whereby aseptic and/or sterile fluid milk having a taste and flavor comparable to ordinary pasteurized homogenized milk may be obtained.

The invention in its broader aspects is not limited to the specific details shown and described, but departures may be made from such details within the scope of the accompanying claims without departing from the principles of the invention.

The invention may furthermore comprise, consist or consist essentially of the hereinbefore recited materials and steps.

I claim:

1. A process of treating fluid milk having a cooked flavor which has been heated in excess of 155° F for a period of time sufficient to procduce a cooked flavor which comprises substantially removing the cooked flavor from said fluid milk by contacting said fluid milk having a cooked flavor with immobilized sulfhydryl oxidase enzyme.

2. A process according to claim 1 wherein said milk is contacted with said enzyme at a temperature of from about 20° to 45° C.

3. A process according to claim 2 which said temperature is from 30° to 35° C.

4. A process according to claim 2 wherein said enzyme is immobilized on glass beads.

* * * * *